(12) United States Patent
Hokao (10) Patent No.: US 7,603,122 B2
(45) Date of Patent: Oct. 13, 2009

(54) MOBILE COMMUNICATION SYSTEM, UE, HANDOVER CONTROL METHOD FOR USE THEREOF AND PROGRAM THEREOF

(75) Inventor: Tomoaki Hokao, Tokyo (JP)

(73) Assignee: NEC Corporation, Tokyo (JP)

( * ) Notice: Subject to any disclaimer, the term of this patent is extended or adjusted under 35 U.S.C. 154(b) by 135 days.

(21) Appl. No.: 11/199,443

(22) Filed: Aug. 8, 2005

(65) Prior Publication Data

US 2006/0040668 A1 Feb. 23, 2006

(30) Foreign Application Priority Data

Aug. 11, 2004 (JP) .............................. 2004-233975

(51) Int. Cl.
*H04W 36/00* (2006.01)
*H04W 4/00* (2006.01)

(52) U.S. Cl. ..................... 455/436; 455/437; 370/334

(58) Field of Classification Search ............... None
See application file for complete search history.

(56) References Cited

U.S. PATENT DOCUMENTS

| 5,920,549 | A | 7/1999 | Bruckert et al. | |
|---|---|---|---|---|
| 6,353,603 | B1 | 3/2002 | Kim | |
| 6,487,191 | B1 * | 11/2002 | Kang et al. | 370/342 |
| 2003/0083070 | A1 * | 5/2003 | Ishikawa et al. | 455/436 |
| 2003/0119452 | A1 * | 6/2003 | Kim et al. | 455/69 |
| 2004/0009782 | A1 * | 1/2004 | Shimizu | 455/522 |
| 2004/0116146 | A1 * | 6/2004 | Sadowsky et al. | 455/525 |
| 2004/0248581 | A1 * | 12/2004 | Seki et al. | 455/450 |

FOREIGN PATENT DOCUMENTS

| CN | 1164950 A | 11/1997 |
|---|---|---|
| CN | 1416288 A | 5/2003 |
| JP | 2002-27522 | 1/2002 |
| WO | WO 03/085856 A1 | 10/2003 |

OTHER PUBLICATIONS

3GPP: "3GPP TS 25.331 v6.2.0 Universal Mobile Telecommunications System (UMTS); Radio Resource Control (RRC) Protocol Specification", pp. 1, 2, 352-363, 583-594 (2004), XP002351564.

* cited by examiner

*Primary Examiner*—Nick Corsaro
*Assistant Examiner*—Joel Ajayi
(74) *Attorney, Agent, or Firm*—Scully, Scott, Murphy & Presser, P.C.

(57) ABSTRACT

The present invention provides a mobile communication system capable of effectively utilizing the limited reception resources available to the UEs and thereby performing steady communication for use in the handover control of UEs. A UE, during communication, determines a handover destination cell according to the result of measurement of the CPICH reception level of each of cells: (1) it measures the reception quality of the downlink DPCH of each of the cells and utilizes the result for the selection of the handover destination cell; (2) switches the handover destination cell and searches for a cell needed for obtaining required communication quality; (3) observes the displacement of the CPICH path loss of each of the cells; and (4) observes whether or not the downlink DPCH transmission power is controlled on the basis of the power request from the UE for each of the handover destination cells.

6 Claims, 12 Drawing Sheets

MOBILE COMMUNICATION SYSTEM, UE, HANDOVER CONTROL METHOD FOR USE THEREOF AND PROGRAM THEREOF

BACKGROUND OF THE INVENTION

1. Field of the Invention

The present invention relates to a mobile communication system, a UE (User Equipment), and a handover control method for their use and its program, and more particularly, to a handover control method for UEs of the CDMA (Code Division Multiple Access) system.

2. Description of the Prior Art

Figure 12:
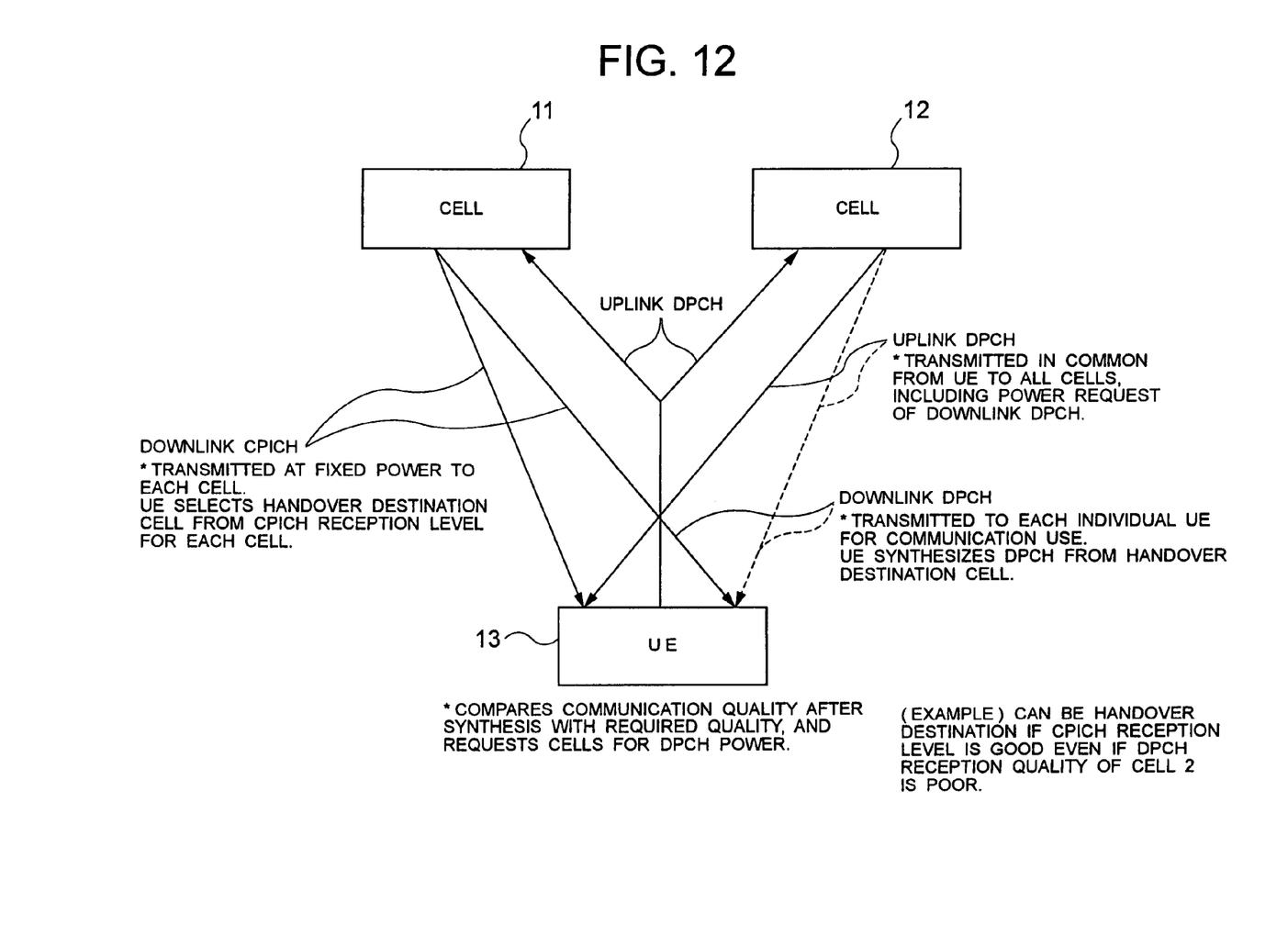
FIG. 12 illustrates conventional handover control.

In a handover control of a UE of the CDMA system, when a UE 13 is to select cells 11 and 12 to which the handover is to take place as shown in FIG. 12, the reception level of a CPICH (Common Pilot Channel) to be received in common within the cells 11 and 12 is measured, and the cells 11 and 12 whose reception level is satisfactory are selected for the handover (see Japanese Patent Application Laid-Open No. 2002-27522 for instance).

More specifically, the selection is made on the basis of the CPICH RSCP (Received Signal Code Power) which is the code power of each of the cells 11 and 12 received by the UE 13, the proportion of the CPICH RSCP to the RSSI (Receive Signal Strength Indication) which is denoted as "CPICH Ec/No" and the CPICH path loss on the wireless path of each of the cells 11 and 12 among other factors.

On the other hand, actual communication (voice, video telephone, packet communication or the like) involving handovers use a channel different from CPICH, namely a DPCH (Dedicated Physical Channel) individually allocated each time one UE 13 performs communication.

Because of this difference between the CPICH used for selecting the cells 11 and 12 to which a handover is to take place and the DPCH used for actual communication, the cell 12, in which the CPICH is good in reception quality but the DPCH is poor in communication quality as viewed from the UE 13, may be selected for the handover.

In the conventional handover control described above, there is a limit to the number of cells to which a UE can perform a handover or to the number of receivers (fingers) among which rake synthesis is possible (e.g. six cells or 12 fingers), but much of the capacity within this limit may be occupied by cells whose DPCH quality is poor. It is desirable for a UE to be able to perform a handover only to cells each of which can provide a DPCH of high communication quality and to achieve synthesis by receiving more multi-path components from those cells.

Furthermore, transmission power on a DPCH from a cell whose DPCH is poor in communication quality not merely is unnecessary for this UE but also interferes with other UEs (e.g. other users), and therefore adversely affects the downlink capacity (user capacity) of the whole system.

What makes the matter worse is that transmission power on the DPCH of such a cell may be made excessively high by a power control request from a UE (for instance reaching the maximum transmission power of the base station) or, if there is a cell whose DPCH is good in quality, may be minimized by a power control request from a UE.

BRIEF SUMMARY OF THE INVENTION

Therefore, an object of the present invention is to obviate the problems noted above and provide a mobile communication system, a UE, a handover control method for their use and its program permitting, in handover control of UE s, effective utilization of reception resources (hardware and software) which each UE has and thereby facilitating steady communication.

A mobile communication system according to a first aspect of the invention, which performs handover control, when any of UEs moves to an adjoining cell, over those UE s, has in each of the UEs means of measuring the reception quality of a dedicated physical channel allocated, together with a common pilot channel over which common transmission takes place within the cell, for communication use to each of the UEs; and means of determining a handover destination cell on the basis of the result of that measurement.

A mobile communication system according to a second aspect of the invention, which performs handover control, when any of UEs moves to an adjoining cell, over those UEs, further has in each of the UEs means of searching for a cell needed for obtaining required communication quality by switching during communication the handover destination cell.

A mobile communication system according to a third aspect of the invention, which performs handover control, when any of UEs moves to an adjoining cell, over those UEs, further has in each of the UEs means of measuring during communication the reception quality of the dedicated physical channel for each of the handover destination cells; means of temporarily cutting off communication with any cell whose dedicated physical channel has been measured to be poor in reception quality; and means of determining whether or not communication quality after rake synthesis satisfies the requirement for quality.

A mobile communication system according to a fourth aspect of the invention, which performs handover control, when any of UEs moves to an adjoining cell, over those UEs, further has in each of the mobile communication means of excluding from the handover destination cells any handover destination cell whose temporary communication cut-off during communication would not affect communication quality after rake synthesis.

A UE according to a first aspect of the invention, wherein handover control takes place when moving to an adjoining cell, has means of measuring the reception quality of a dedicated physical channel allocated, together with a common pilot channel over which common transmission takes place within the cell, for communication use; and means of determining a handover destination cell on the basis of the result of that measurement.

A UE according to a second aspect of the invention, wherein handover control takes place when moving to an adjoining cell, has means of searching for a cell needed for obtaining required communication quality by switching the handover destination cell during communication.

A UE according to a third aspect of the invention, wherein handover control takes place when moving to an adjoining cell, has means of measuring the reception quality of a dedicated physical channel allocated, together with a common pilot channel over which common transmission takes place within each of the handover destination cells, for communication use; means of temporarily cutting off communication with any cell whose dedicated physical channel has been measured to be poor in reception quality; and means of determining whether or not communication quality after rake synthesis satisfies the requirement for quality.

A UE according to a fourth aspect of the invention, wherein handover control takes place when moving to an adjoining cell, has means of excluding from the handover destination cells any handover destination cell whose temporary communication cut-off during communication would not affect communication quality after rake synthesis.

A handover control method according to the invention is intended for use in a mobile communication system wherein, when any of UEs moves to an adjoining cell, handover control over the UE takes place, the handover control method having on the UE side a step of measuring the reception quality of a dedicated physical channel allocated, together with a common pilot channel over which common transmission takes place within the cell, for communication use to each of the UEs; and a step of determining the handover destination cell on the basis of the result of that measurement.

A handover control method according to a second aspect of the invention is intended for use in a mobile communication system wherein, when any of UEs moves to an adjoining cell, handover control over the UE takes place, the handover control method having on the UE side a step of searching for a cell needed for obtaining required communication quality by switching during communication the handover destination cell.

A handover control method according to a third aspect of the invention is intended for use in a mobile communication system wherein, when any of UEs moves to an adjoining cell, handover control over the UE takes place, the handover control method having on the UE side a step of measuring the reception quality of a dedicated physical channel allocated, together with a common pilot channel over which common transmission takes place within the cell, for communication use to each of the UEs; a step of temporarily cutting off communication with any cell whose dedicated physical channel has been measured to be poor in reception quality; and a step of determining whether or not communication quality after rake synthesis satisfies the requirement for quality.

A handover control method according to a fourth aspect of the invention is intended for use in a mobile communication system wherein, when any of UEs moves to an adjoining cell, handover control over the UE takes place, the handover control method further having on the UE side a step of excluding from the handover destination cells any handover destination cell whose temporary communication cut-off during communication would not affect communication quality after rake synthesis.

A program of a handover control method according to a first aspect of the invention is intended for use in a mobile communication system wherein, when any of UEs moves to an adjoining cell, handover control over the UE takes place, the program causing the computer of the UE to execute processing to measure the reception quality of a dedicated physical channel allocated, together with a common pilot channel over which common transmission takes place within the cell, for communication use to each of the UEs; and processing to determine the handover destination cell on the basis of the result of that measurement.

A program of a handover control method according to a second aspect of the invention is intended for use in a mobile communication system wherein, when any of UEs moves to an adjoining cell, handover control over the UE takes place, the program causing the computer of the UE to execute processing to search for a cell needed for obtaining required communication quality by switching during communication the handover destination cell.

A program of a handover control method according to a third aspect of the invention is intended for use in a mobile communication system wherein, when any of UEs moves to an adjoining cell, handover control over the UE takes place, the program causing the computer of the UE to execute processing to measure the reception quality of a dedicated physical channel allocated, together with a common pilot channel over which common transmission takes place within the cell, for communication use to each of the UEs; processing to temporarily cut off communication with any cell whose dedicated physical channel has been measured to be poor in reception quality; and processing to determine whether or not communication quality after rake synthesis satisfies the requirement for quality.

A program of a handover control method according to a fourth aspect of the invention is intended for use in a mobile communication system wherein, when any of UEs moves to an adjoining cell, handover control over the UE takes place, the program causing the computer of the UE to execute processing to exclude from the handover destination cells any handover destination cell whose temporary communication cut-off during communication would not affect communication quality after rake synthesis.

Thus, in order to alleviate the problems noted above, the mobile communication system according to the invention, in performing handover control over a UE of the CDMA system, determines the handover destination cell by taking into account the communication quality of not only the CPICH over which transmission takes place in common to the cells but also that of the DPCH allocated for communication use by each UE.

To describe it more specifically, the mobile communication system according to the invention, when the UE is engaged in communication, performs control regarding DPCH in the following way in addition to determining the handover destination cell according to the result of measurement of the CPICH reception level of each of the cells including the CPICH RSCP, the proportion of the CPICH RSCP to the RSSI (CPICH Ec/No) and the CPICH path loss on the wireless path of each cell.

(1) The UE measures the reception quality of the downlink DPCH of each cell, and uses the result of measurement for the selection of a handover destination cell. For instance, it measures the DPCH SIR (DPCH Signal to Interference power Ratio) and the DPCH RSCP of each cell, and notifies the network to exclude cells of poor quality from handover destinations.

(2) The UE switches the handover destination cell, and searches for a cell needed for obtaining the required communication quality. For instance, the UE, on the basis of the result of (1) above, temporarily cuts off communication with the cell whose DPCH has been determined to be poor in reception quality, and checks whether or not its total communication quality satisfies the requirement for communication quality designated by the network.

Then the UE notifies the network to exclude from handover destinations the cell which has been judged as a result of check to be not affecting the total communication quality (its cut-off will not prevent satisfaction of the requirement for communication quality).

Also, the UE may then achieve a further gain in total communication quality by allocating the finger used for reception from the cell to be temporarily cut off to the multipath components of the remaining cells.

(3) The UE observes the displacement of the CPICH path loss (the extent of level drop in the wireless section) of each of the cells. For instance, even for the cell whose cut-off has been judged not affecting the total communication quality (its cut-off will not prevent satisfaction of the requirement for communication quality) according to the result of (2) above, if the CPICH path loss is found decreasing with the lapse of time (along with the shift of the UE), the UE will foresee its influence on the total communication quality in the near future, and leave them as a handover destination.

(4) The UE observes whether or not the downlink DPCH transmission power is controlled in accordance with a power control request from it for each of the handover destination cells. For instance, regarding any cell of which the displacement of the downlink DPCH RSCP (up or down from the previous time slot) measured as stated in (1) above and the power control request pattern (up or down) of the downlink DPCH transmitted from the UE using the uplink DPCH on the same time axis are found not identical, the UE judges that it is not normally performing uplink communication, and notifies the network to exclude it from handover destinations.

As the displacement of the reception quality of the downlink DPCH in practice is heavily dependent not only on the power control request of the downlink DPCH from the UE but also on the path loss (dependent on the distance between the UE and the base station), strictly speaking this also has to be taken into consideration, but observation of the displacement for a long enough period (e.g. one second=1000 samples or more) would make it possible to judge whether or not the power control request from the UE is complied with.

Incidentally, whereas there is in a CDMA type mobile communication system known as power balancing by which the transmission power of each cell being handed over is balanced on the part of the network, in the mobile communication system according to the invention handing over is intended to enable the UE to respond for itself always in the best state to the wireless environment which varies from moment to moment.

In wireless communication wherein some communication error to some extent (permissible communication quality) both uplink and downlink is allowed for, it is impossible to execute perfect power control, both uplink and downlink, over everyone of handover destination cells, and active control should be so effected as to enable the UE for itself to satisfy its communication quality requirement.

Since the power balancing function of the network does not take account of the reception quality of the DPCH as viewed from the UE and the power control which is required by the UE to the network using the uplink DPCH is addressed to all the cells in common, it is inevitable for the DPCH to be unbalanced in quality as viewed from the UE.

In this way, in the mobile communication system according to the present invention, it is made possible in the handover control of UE to perform steady communication by effectively utilizing the limited reception resources (hardware and software) available to the UE. The mobile communication system according to the present invention also enables the system capacity (the number of accommodable users) of the whole network to be increased.

A reason for these advantages is that the UE determines the cells required for satisfying the total communication quality requirement by measuring the reception quality of the DPCH of each handover destination cell used in communication and switching the cell for reception (rake synthesis), and makes them handover destinations.

Another reason is that, as the UE identifies a cell of good uplink reception quality by observing whether or not each of the cells which are handover destinations conforms to the power control request transmitted from the UE, and selects it as the handover destination cell.

According to the present invention, by using the configuration and operations to be described below, it is made possible in the handover control of a UE to effectively utilize the limited reception resources (hardware and software) available to the UE and thereby to perform steady communication.

DETAILED DESCRIPTION OF THE PREFERRED EMBODIMENTS

Figure 1:
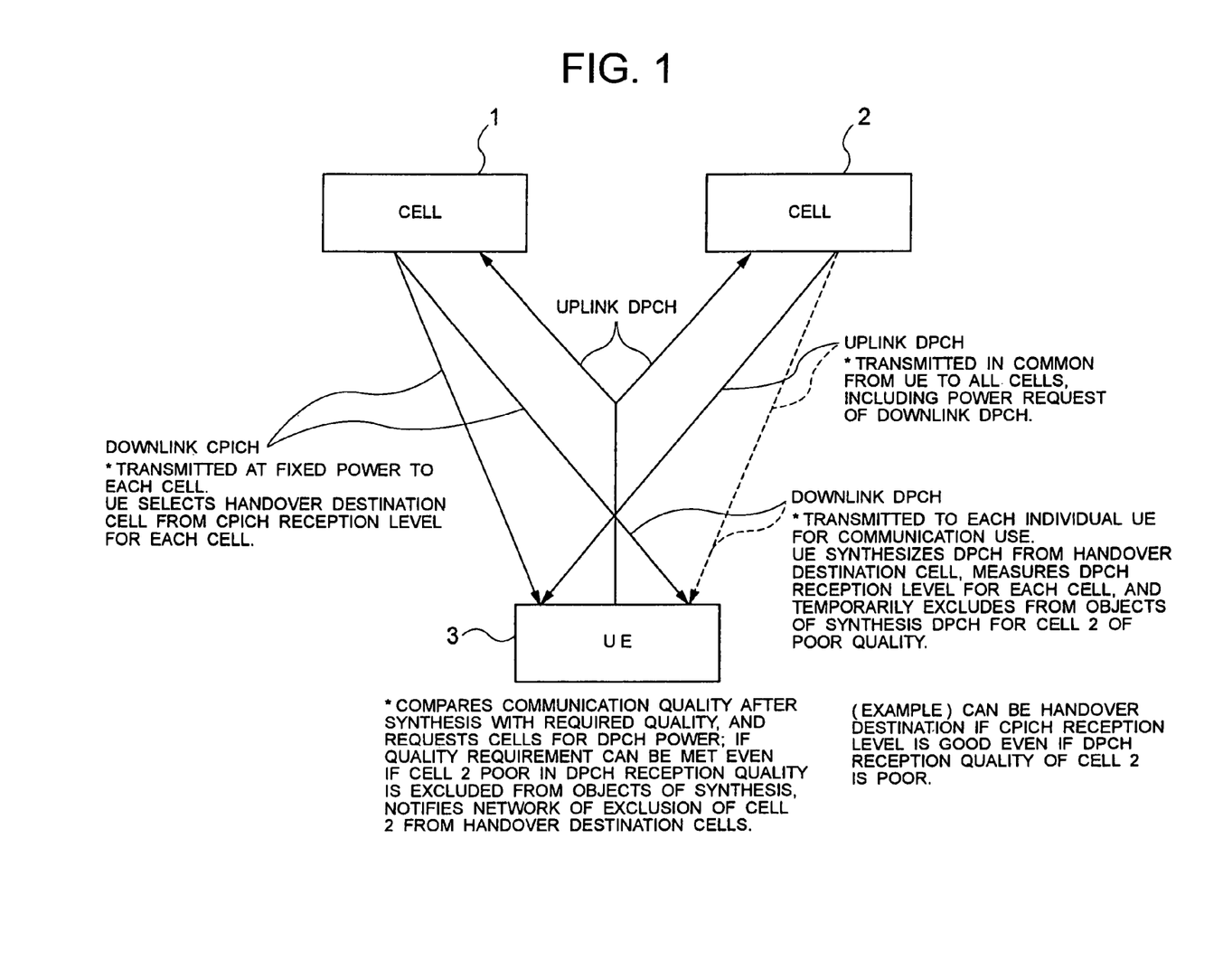
FIG. 1 is a block diagram showing the configuration of a mobile communication system, which is a preferred embodiment of the present invention.

Next, a preferred embodiment of the present invention will be described with reference to accompanying drawings. FIG. 1 is a block diagram showing the configuration of a mobile communication system, which is an embodiment of the invention. Referring to FIG. 1, the mobile communication system of the embodiment comprises base stations (not shown) (cells 1 and 2 corresponding to those base stations are shown FIG. 1) and a UE 3 of the CDMA system. Although the base stations are controlled by a RNC (Radio Network Controller) (not shown), its description will be dispensed with here because control by the RNC has no direct bearing on this embodiment.

The UE 3 performs reception from the downlink CPICH and the downlink DPCH for each of the cells 1 and 2, and transmission over an uplink DPCH in common for both cells 1 and 2.

Transmission over the downlink CPICH is performed at a fixed level of power for each of the cells 1 and 2, and the UE 3 selects the handover destination cell on the basis of the reception level on the downlink CPICH for each of the cells 1 and 2. For the communication purpose, transmission is performed over the downlink DPCH individually for each UE 3, and the UE 3 achieves synthesis of reception over the downlink DPCH from the handover destination cell. In this embodiment, the UE 3 measures the quality of reception from the downlink DPCH for each of the cells 1 and 2, and temporarily excludes from the objects of synthesis the downlink DPCH for the cell 2 whose reception quality is poor. Transmission over the uplink DPCH is performed from the UE 3 in common to both of the cells 1 and 2, and includes a power request from the downlink DPCH.

The UE 3 compares the quality of communication from the handover destination cell after synthesis over the downlink DPCH with the required level of quality, and transmits a power request to the cells 1 and 2 over the uplink DPCH. If the quality requirement can be met even if the poor quality downlink DPCH of the cell 2 is excluded from the objects of synthesis, the UE 3 will notify the network (not shown) of the exclusion of the cell 2 from handover destination cells. The cell 2 can be a handover destination if, for instance, the reception level of the downlink CPICH is satisfactory even if the reception quality of the downlink DPCH is poor.

Figure 2:
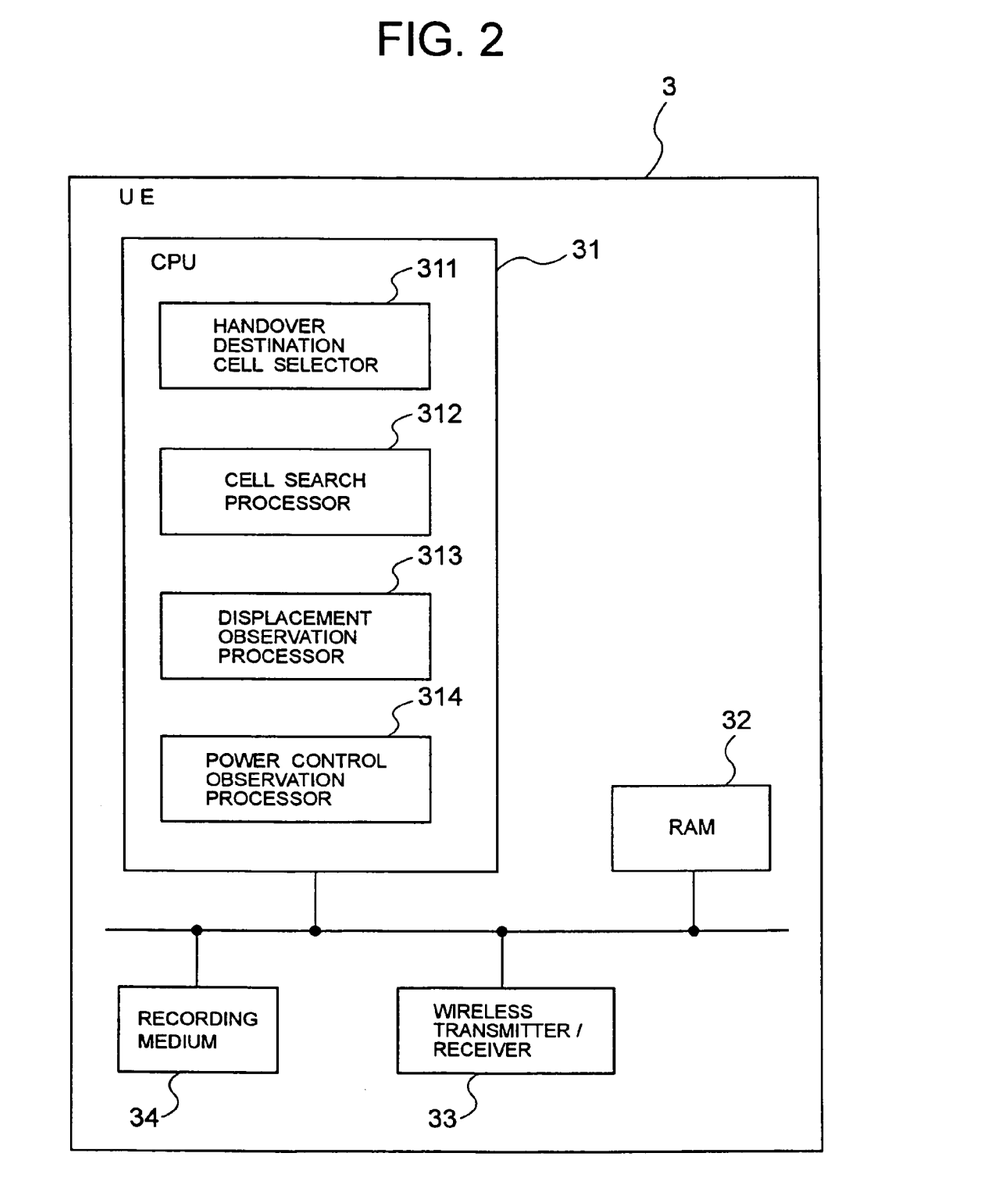
FIG. 2 is a block diagram showing an example of configuration of a UE shown in FIG. 1.

FIG. 2 is a block diagram showing an example of configuration of the UE 3 shown in FIG. 1. Referring to FIG. 2, the UE 3 comprises a CPU (Central Processing Unit) 31, a RAM (Random Access Memory) 32, a wireless transmitter/receiver 33 for wireless transmission and reception in the cells 1 and 2, and a recording medium 34 for storing programs to be executed by the CPU 31.

The CPU 31 comprises a handover destination cell selector 311 which measures the reception quality of the downlink DPCH for each of the cells 1 and 2 and selects the handover destination cell on that basis, a cell search processor 312 which switches the handover destination cell and searches for a cell needed for obtaining the required communication quality, a displacement observation processor 313 which observes the displacement of the CPICH path loss (the extent of level drop in the wireless section) for each cell, and a power control observation processor 314 which checks whether or not transmission power of the downlink DPCH is controlled in accordance with a power control request for each of the handover destination cells. These units are realized by the execution by the CPU 31 of the programs stored in the recording medium 34.

Figure 8:
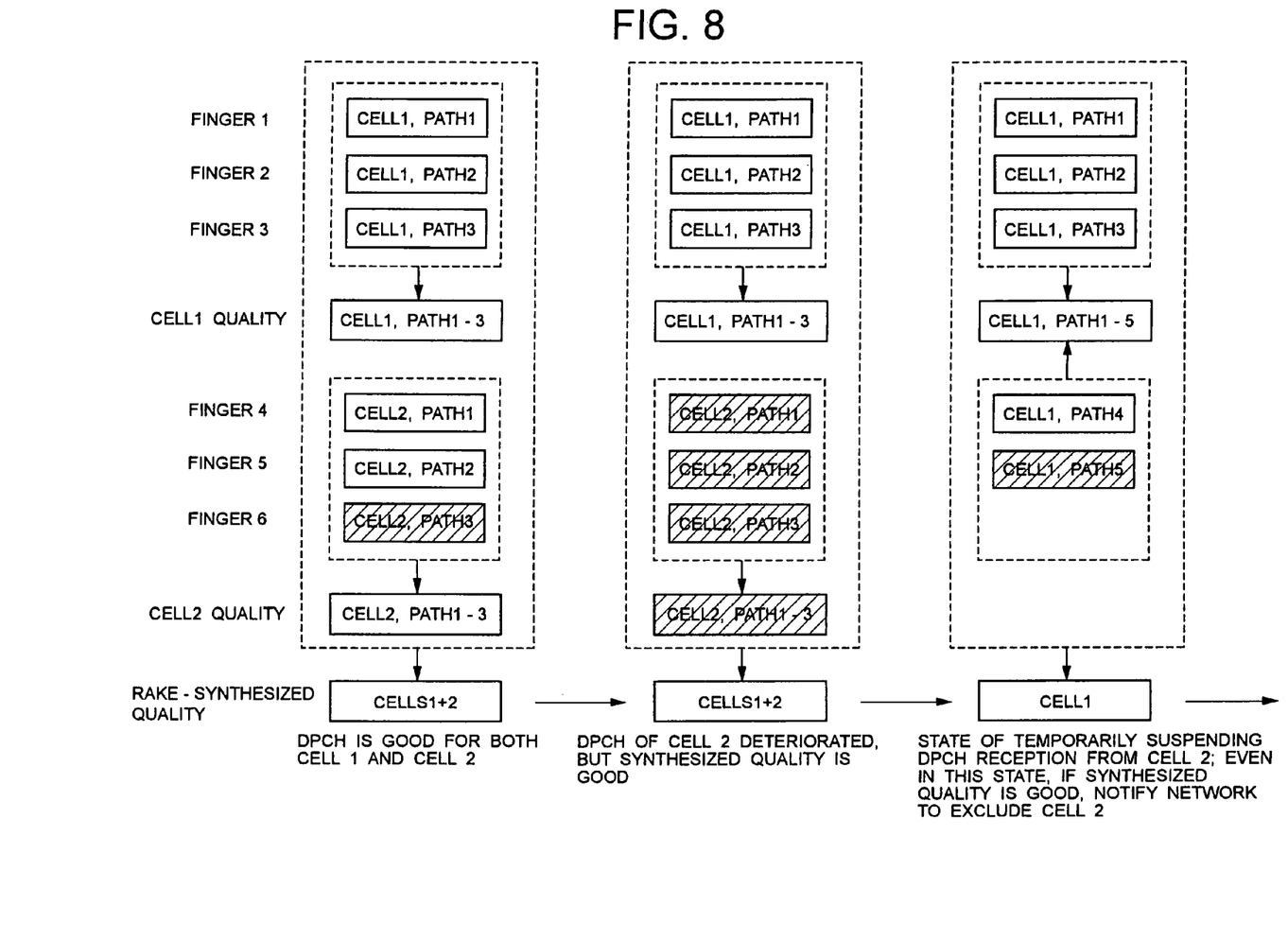
FIG. 8 illustrates handover control taking into account the reception quality of the downlink dedicated physical channel.
Figure 9:
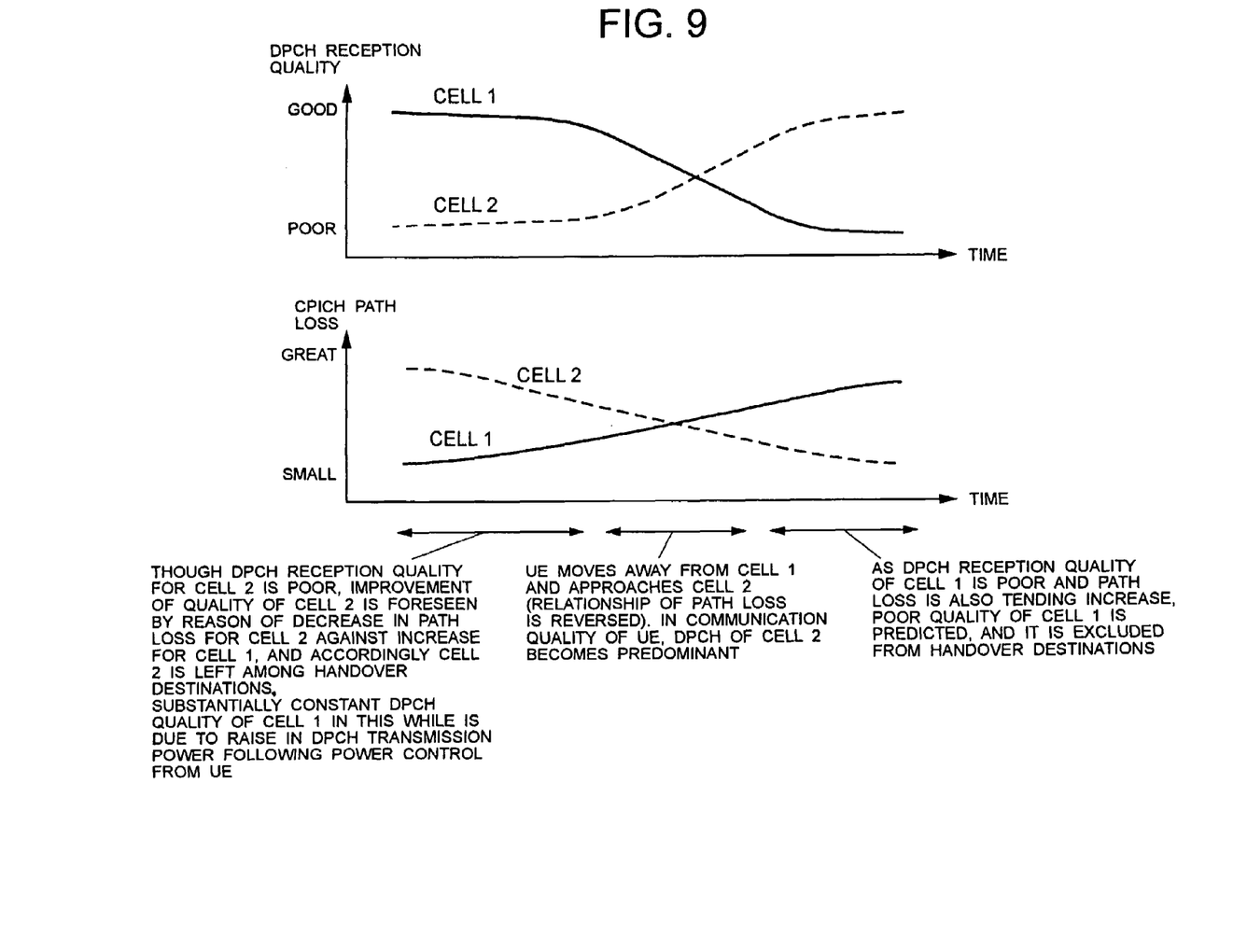
FIG. 9 illustrates handover control taking into account the reception quality and the path loss of the downlink DPCH.
Figure 10:
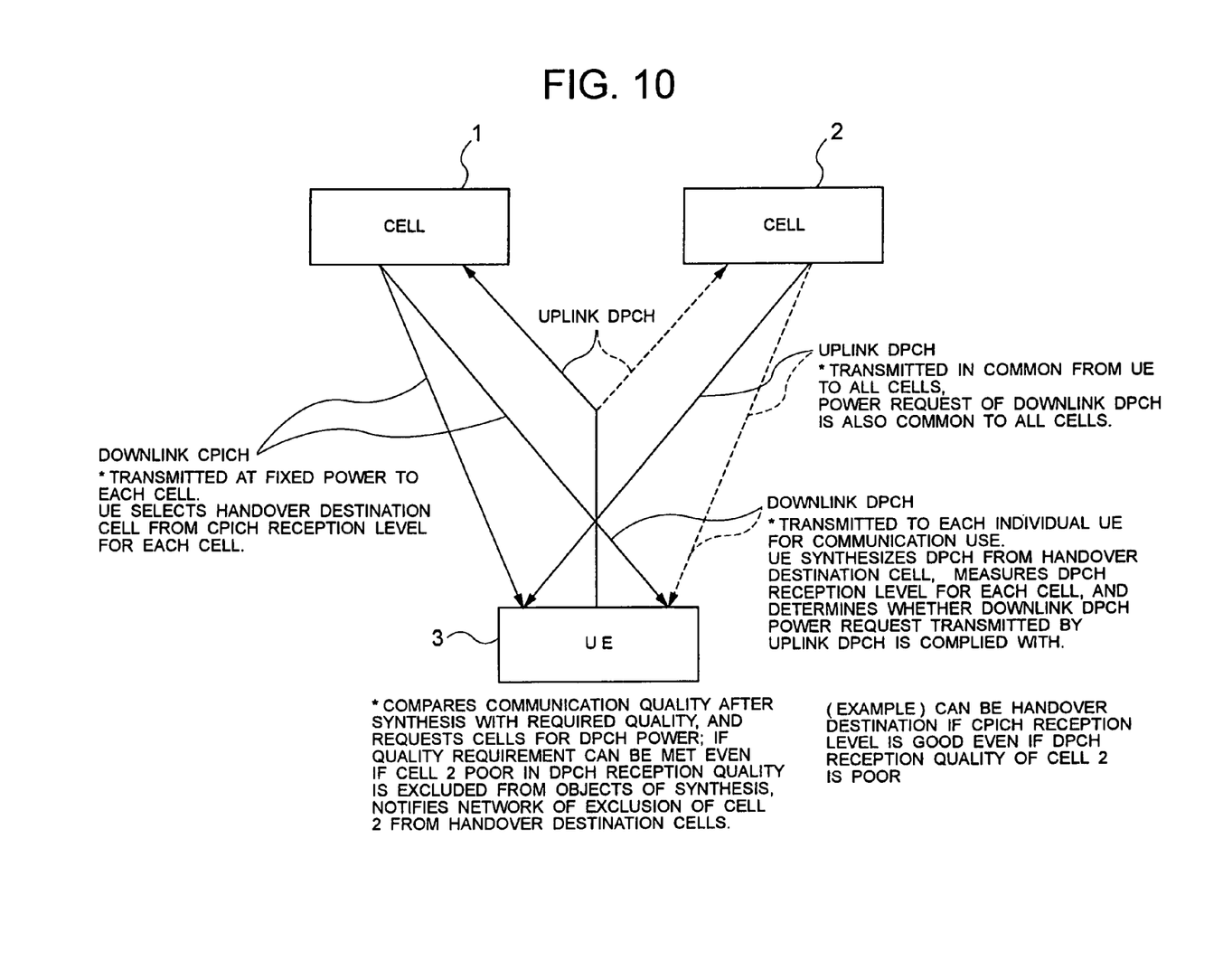
FIG. 10 illustrates handover control taking into account the reception quality of the uplink DPCH.
Figure 11:
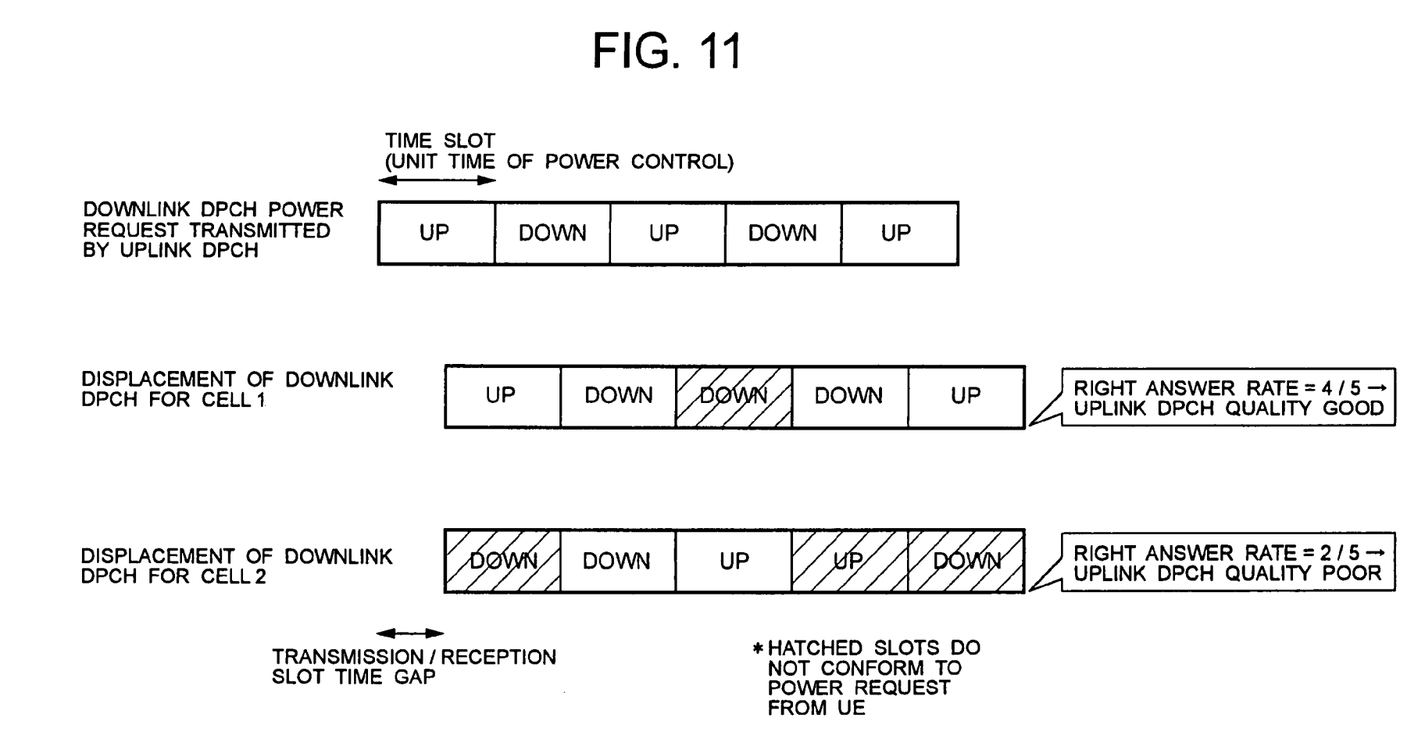
FIG. 11 illustrates determination of the quality of the uplink DPCH by utilizing downlink power control.

FIG. 3 through FIG. 7 are flow charts showing the operation of the UE 3 illustrated in FIG. 2. FIG. 8 illustrates handover control taking into account the reception quality of the downlink DPCH; FIG. 9 illustrates handover control taking into account the reception quality and the path loss of the downlink DPCH; FIG. 10 illustrates handover control taking into account the reception quality of the uplink DPCH; and FIG. 11 illustrates determination of the quality of the uplink DPCH by utilizing downlink power control.

Handover control in the preferred embodiment of the invention will be described below with reference to these FIG. 1 through FIG. 11. The processing charted in FIG. 3 through FIG. 7 is realized by the execution by the CPU 31 of programs stored in the recording medium 34.

In this embodiment, the UE 3, in determining the handover destination cell, takes into account the communication quality of not only the downlink CPICH over which transmission takes place in common to the cells 1 and 2 but also that of the downlink DPCH allocated for communication use by each UE 3.

In more specific terms, during communication, the UE 3 performs the following control over the downlink DPCH in addition to processing to determine the handover destination cell (step S1 in FIG. 3) on the basis of the result of measurement of the reception level of the downlink CPICH of each of the cells 1 and 2 (including the CPICH RSCP, the proportion of the CPICH RSCP to the RSSI (CPICH Ec/No) and the CPICH path loss on the wireless path of each of the cells.

The UE 3 measures the reception quality of the downlink DPCH for each of the cells 1 and 2, and utilizes the result of measurement for the selection of the handover destination cell by the handover destination cell selector 311. For instance, the UE 3 measures the DPCH SIR and the DPCH RSCP of each of the cells 1 and 2, and notifies the network to exclude cells of poor quality from handover destinations (step S2 in FIG. 3)

Next, the UE 3 switches the handover destination cell, and searches a cell needed for obtaining the required communication quality (step S3 in FIG. 3) by the cell search processor 312.

Figure 4:
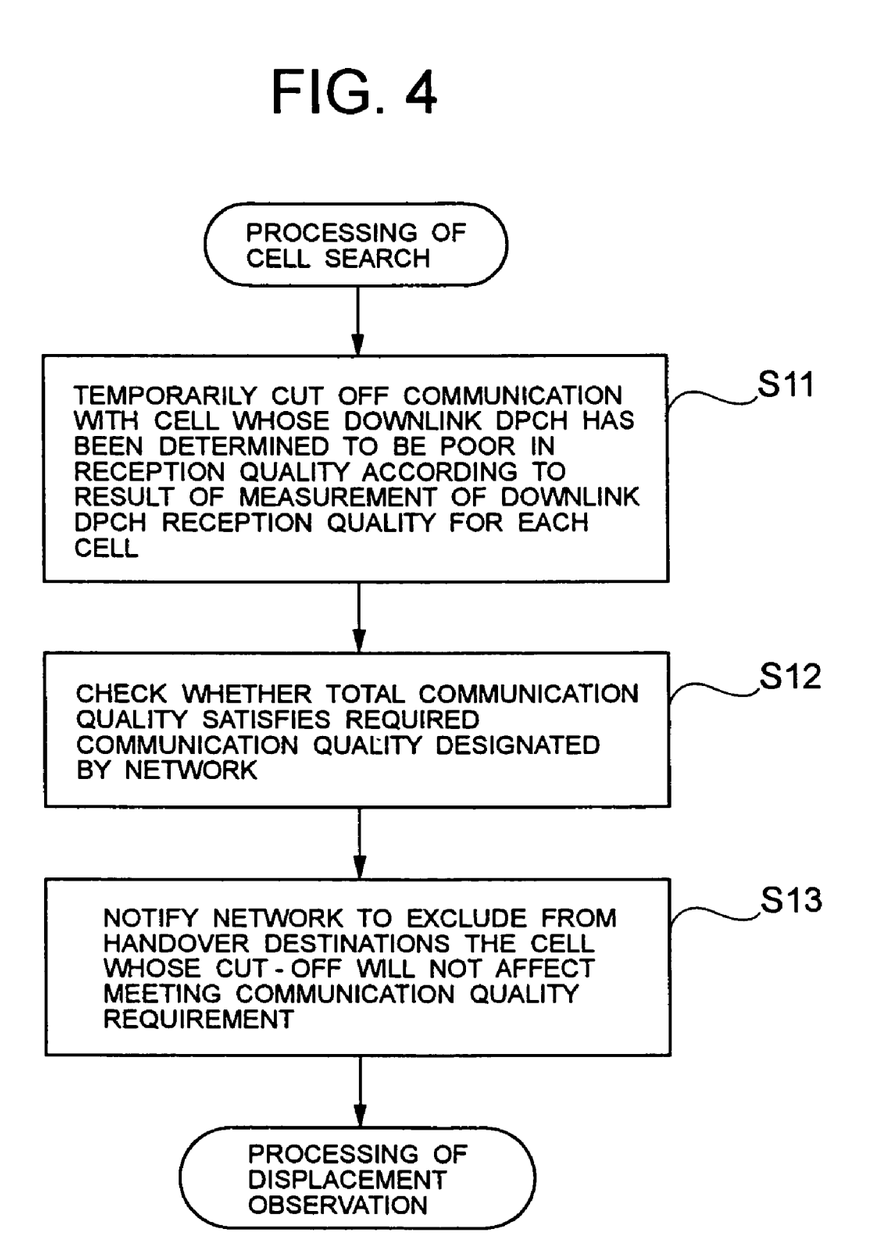
FIG. 4 is a flow chart showing the operation of the UE shown in FIG. 2.

For instance, the UE 3 temporarily cuts off communication with the cell whose downlink DPCH has been determined to be poor in reception quality according to the result of measurement of the reception quality of the downlink DPCH (step S11 in FIG. 4), and judges whether or not its total communication quality satisfies the requirement for communication quality designated by the network (step S12 in FIG. 4). Then the UE 3 notifies the network to exclude from handover destinations the cell which has been judged as a result of check to be not affecting the total communication quality (its cut-off will not prevent satisfaction of the requirement for communication quality) (step S13 in FIG. 4).

Figure 7:
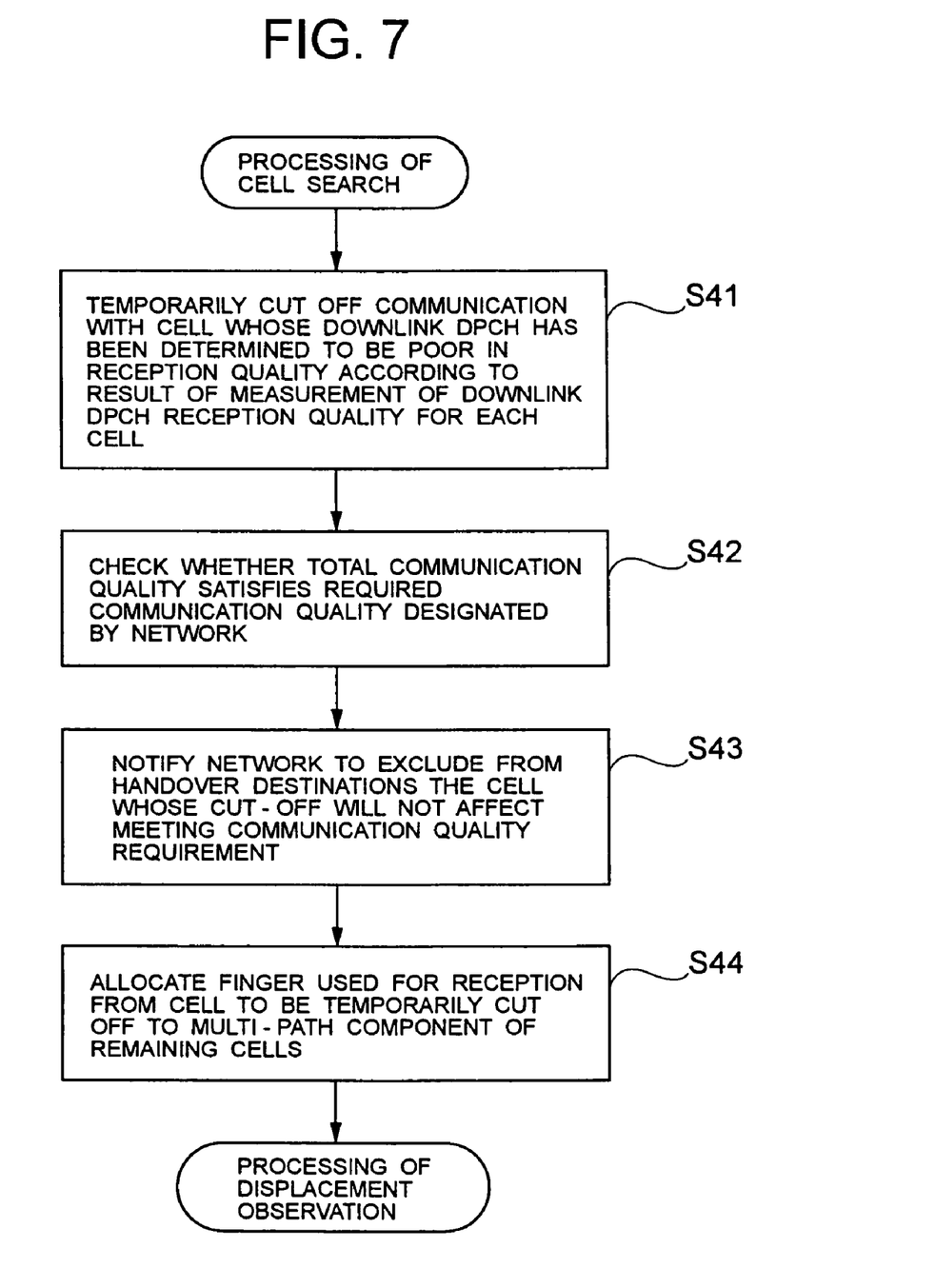
FIG. 7 is a flow chart showing the operation of the UE shown in FIG. 2.

Also, the UE 3 may then achieve a further gain in total communication quality by allocating the receiver (finger) used for reception of the cell to be temporarily cut off to the multi-path components of the remaining cells (steps S41 through S44 in FIG. 7).

Thus, where the number of fingers of the UE 3 is six as shown in FIG. 8, if fingers 1 through 3 are respectively "cell 1, path 1", "cell 1, path 2" and "cell 1, path 3", the quality of the cell 1 will be "cell 1, path 1 to 3". Or if fingers 4 through 6 are respectively "cell 2, path 1", "cell 2, path 2" and "cell 2, path 3", the quality of the cell 2 will be "cell 2, path 1 through 3". Therefore, the rake-synthesized quality will be "cell 1+2". The path here represents the multi-path component.

When both of the cells 1 and 2 have shifted from the state of the downlink DPCH being good in reception quality to a state in which reception from the cell 2 over the downlink DPCH has been temporarily stopped via a state in which the reception quality of the downlink DPCH from the cell 2 has deteriorated but the synthesized quality is good, a further gain in total communication quality may be achieved by respectively allocating "cell 1, path 4" and "cell 1, path 5" to fingers 4 and 5. Incidentally, if the synthesized quality is still good even in this state, the network will be notified to exclude the cell 2 from the handover destinations.

Figure 3:
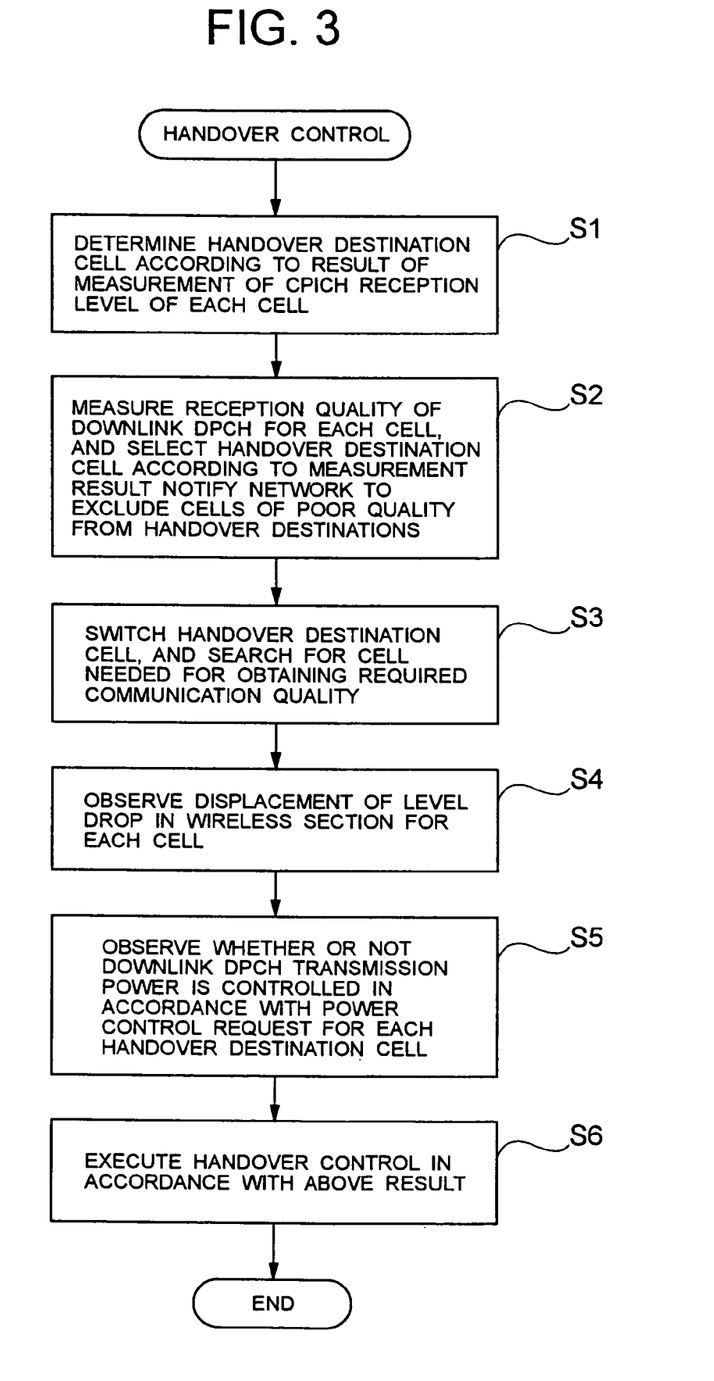
FIG. 3 is a flow chart showing the operation of the UE shown in FIG. 2.

Then, the UE 3 observes with the displacement observation processor 313 the displacement of the CPICH path loss (the extent of level drop in the wireless section) of each of the cells 1 and 2 (step S4 in FIG. 3).

Figure 5:
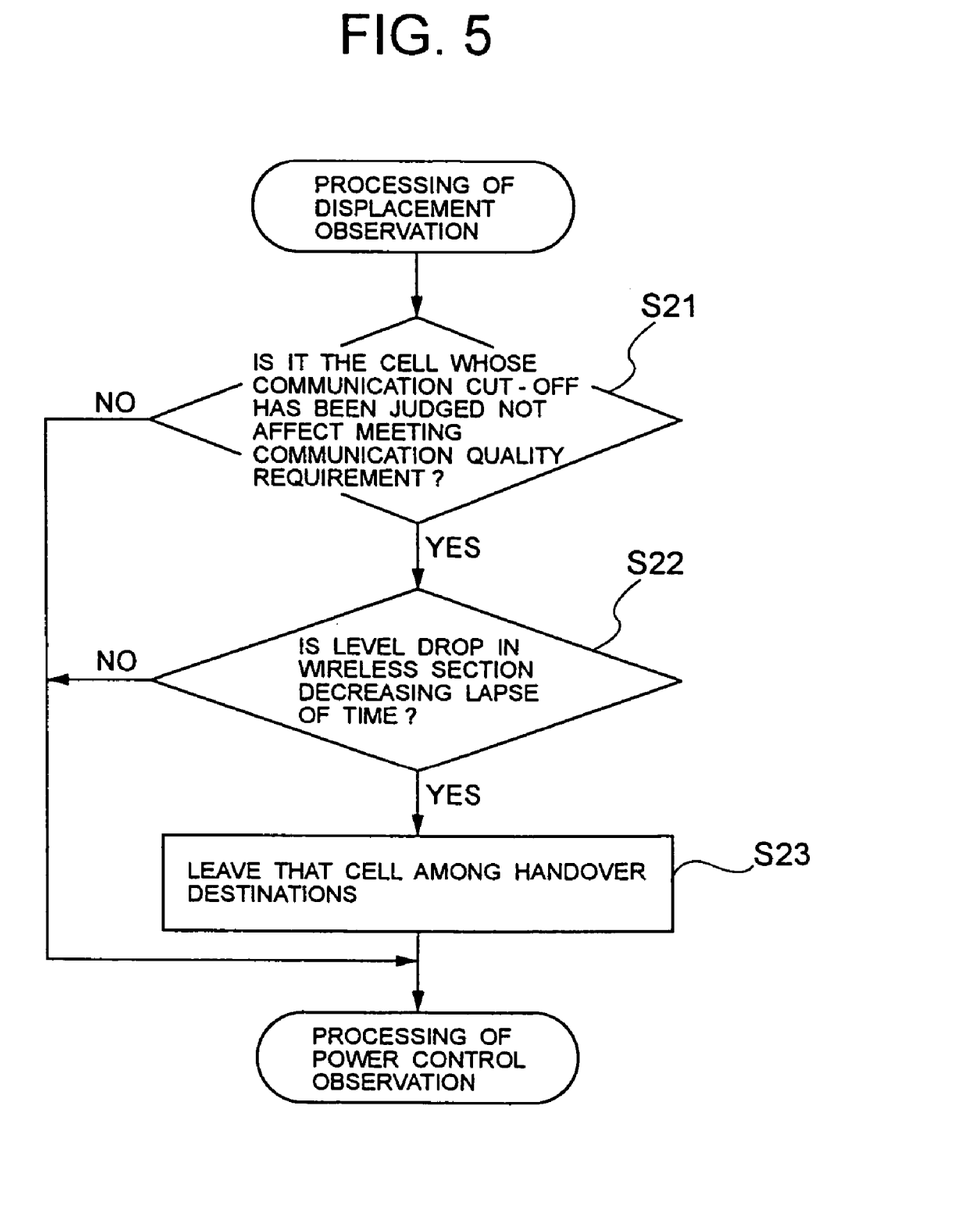
FIG. 5 is a flow chart showing the operation of the UE shown in FIG. 2.

For instance, if cells whose cut-off has been judged not affecting the total communication quality (its cut-off will not prevent satisfaction of the requirement for communication quality) (step S21 in FIG. 5) according to the result of the search for a cell needed for obtaining the required communication quality are found decreasing in CPICH path loss with the lapse of time (along with the shift of the UE 3) (step S22 in FIG. 5), the UE 3 will foresee its influence on the total communication quality in the near future, and leave them among handover destinations (step S23 in FIG. 5).

Thus, though the quality of reception over the downlink DPCH in the cell 2 is poor, as shown in FIG. 9, the UE 3 foresees improvement of the quality of reception over the downlink DPCH in the cell 2 by reason of the decrease in CPICH path loss of the cell 2 against an increase in CPICH path loss of the cell 1, and accordingly leaves the cell 2 among handover destinations. The substantially constant quality of reception over the downlink DPCH in the cell 1 is due to a raise in the transmission power of the downlink DPCH under power control from the UE 3.

As the UE 3 moves away from the cell 1 and approaches the cell 2, the relationship between CPICH path loss of the cell 1 and that of the cell 2 is reversed. In the communication quality of the UE 3 after synthesis, the downlink DPCH of the cell 2 becomes predominant.

When the UE 3 further approaches the cell 2, as the quality of reception over the downlink DPCH in the cell 1 deteriorates and its CPICH path loss is also tending increase, it is predicted that the quality of reception over the downlink DPCH in the cell 1 will not improve, the network is notified to exclude the cell 1 from handover destinations.

After that, the UE 3 observes with the power control observation processor 314 whether or not the downlink DPCH transmission power is controlled in accordance with a power control request from the UE 3 for each of the handover destination cells (step S5 in FIG. 3).

Figure 6:
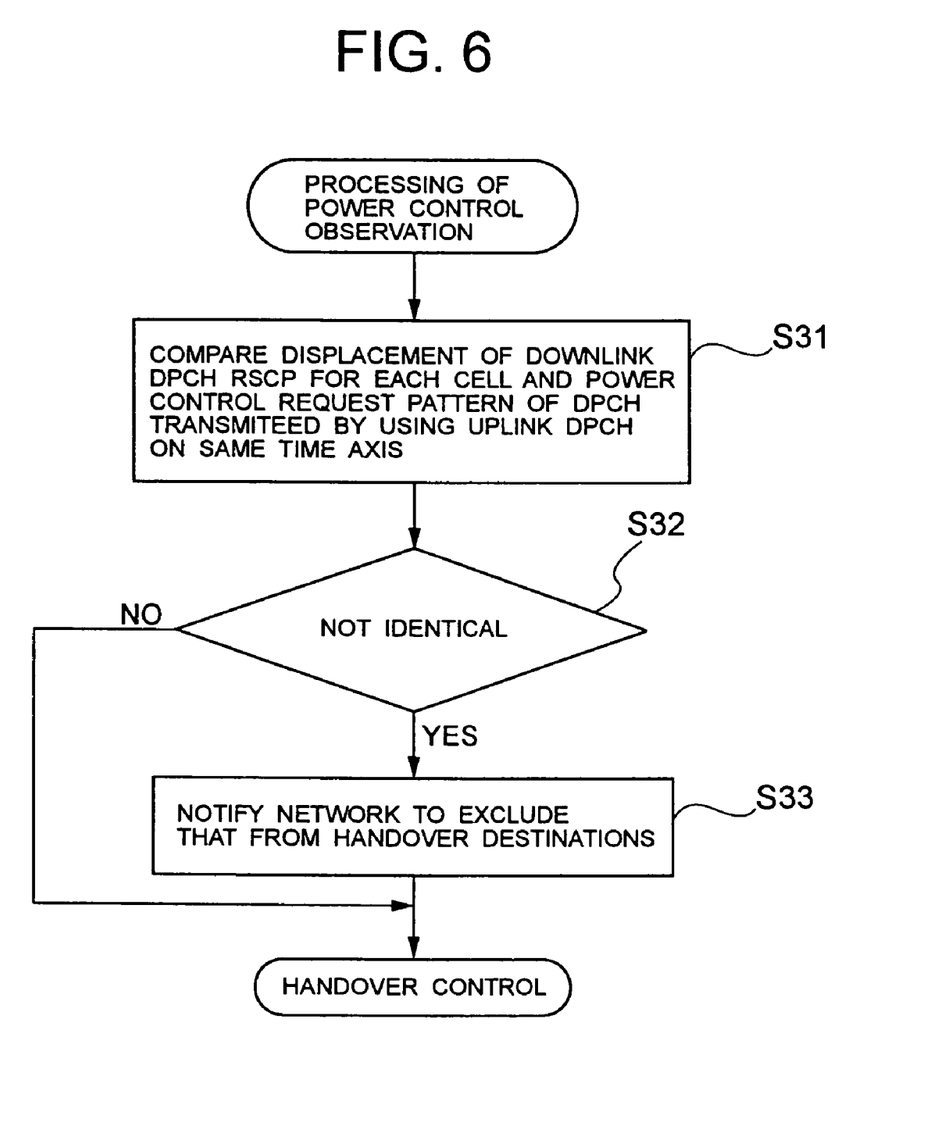
FIG. 6 is a flow chart showing the operation of the UE shown in FIG. 2.

For instance, regarding any of the cells 1 and 2 of which the displacement of downlink DPCH RSCP (up or down from the previous time slot) measured by the handover destination cell selector 311 and the power control request pattern (up or down) of the downlink DPCH transmitted from the UE 3 using the uplink DPCH on the same time-axis are found not identical (steps S31 and S32 in FIG. 6), the UE 3 judges that it is not normally performing uplink communication, and notifies the network to exclude it from handover destinations (step S33 in FIG. 6).

This control is illustrated in FIG. 10 and FIG. 11. Referring to FIG. 11, the downlink displacement of DPCH RSCP of the cell 1 is "down" in response to a power request "up" in the third time slot, which is judged as representing a "right answer rate of ⅘, and accordingly good quality of the uplink DPCH".

On the other hand, the downlink displacement of DPCH RSCP of the cell 2 is "down" in response to a power request "up" in the first time slot, "up" in response to a power request "down" in the fourth time slot and "down" in response to a power request "up" in the fifth time slot, which are judged as representing a "right answer rate of ⅖, and accordingly poor quality of the uplink DPCW".

As the displacement of the reception quality of the downlink DPCH in practice is heavily dependent not only on the power control request of the downlink DPCH from the UE 3 but also on the path loss (dependent on the distance between the UE 3 and the base station), strictly speaking this also has to be taken into consideration, but observation of the displacement for a long enough period (e.g. one second=1000 samples or more) would make it possible to judge whether or not the power control request from the UE 3 is complied with.

Incidentally, whereas there is a CDMA type mobile communication system known as power balancing by which the transmission power of each cell being handed over is balanced on the part of the network, in this embodiment handing over is accomplished always in the best state as the UE 3 responds to the wireless environment which varies from moment to moment.

In wireless communication wherein some communication error to some extent (permissible communication quality) both uplink and downlink is allowed for, it is impossible to execute perfect power control, both uplink and downlink, over every one of handover destination cells, and active control should be so effected as to enable the UE 3 for itself to satisfy its communication quality requirement.

Since the power balancing function of the network does not take account of the reception quality of the DPCH as viewed from the UE 3 and the power control which is required by the UE 3 to the network using uplink DPCH is addressed to all the cells in common, it is inevitable for the downlink DPCH to be unbalanced in quality as viewed from the UE 3.

As described above, in this embodiment of the invention, the UE 3 measures the reception quality of each DPCH to be used in communication with respect to every cell of handover destinations, determines the cells required for satisfying the total communication quality requirement by switching the cell for reception (rake synthesis), and makes them handover destinations, it is possible to perform steady communication by effectively utilizing the limited reception resources (hardware and software) available to the UE 3, and to increase the system capacity (the number of accommodable users) of the whole network.

Further in this embodiment, as the UE 3 identifies a cell of good uplink reception quality by observing whether or not each of the cells which are handover destinations conforms to the power control request transmitted from the UE 3, and selects it as the handover destination cell, it is possible to perform steady communication by effectively utilizing the limited reception resources (hardware and software) available to the UE 3, and to increase the system capacity (the number of accommodable users) of the whole network.

What is claimed is:

1. A mobile communication system that performs handover control, when any of UEs moves to an adjoining cell, over those UEs, comprising in each of said UEs:

means of measuring the reception quality of a dedicated physical channel allocated, together with a common pilot channel over which common transmission takes place within the cell, for communication use to each of said UEs;

means of determining a handover destination cell on the basis of the result of that measurement;

means of determining whether or not communication quality after rake synthesis satisfies a requirement for quality;

means, in said handover control, of searching for a cell needed for obtaining required communication quality by switching during communication said handover destination cell;

means of, in said handover control, excluding from said handover destination cells any handover destination cell that does not conform to a power control request transmitted from said UE during communication;

means of, in said handover control, measuring during communication the reception quality of said dedicated physical channel for each of said handover destination cells;

means of temporarily cutting off communication with any cell whose dedicated physical channel has been measured to be poor in reception quality, wherein each of said UEs further includes means of, in said handover control, excluding from said handover destination cells any handover destination cell whose temporary communication cut-off during communication would not affect communication quality after rake synthesis.

2. The mobile communication system according to claim 1, wherein each of said UEs further includes means of, in said handover control, keeping among said handover destinations any cell, out of the handover destination cells whose temporary communication cut-off during communication has been considered not to affect communication quality after rake synthesis, that is judged from the displacement of the level drop in a wireless section estimated from said common pilot channel to affect the communication quality after said raked synthesis when said UE is approaching.

3. A UE wherein handover control takes place when moving to an adjoining cell, comprising:

means of measuring the reception quality of a dedicated physical channel allocated, together with a common pilot channel over which common transmission takes place within the cell, for communication use;

means of determining the handover destination cell on the basis of the result of that measurement;

means of determining whether or not communication quality after rake synthesis satisfies a requirement for quality;

means of searching, in said handover control, for a cell needed for obtaining required communication quality by switching the handover destination cell during communication;

means of excluding, in said handover control, from said handover destination cells, any handover destination cell that does not conform to a power control request transmitted from said UE during communication;

means of measuring, in said handover control, the reception quality of said dedicated physical channel for each of said handover destination cells; and means of temporarily cutting off communication with any cell whose dedicated physical channel has been measured to be poor in reception quality; and means of excluding, in said handover control, from said handover destination cells any handover destination cell whose temporary communication cut-off during communication would not affect communication quality after rake synthesis.

4. The UE according to claim 3, further including means of keeping, in said handover control, among said handover destinations any cell, out of the handover destination cells whose temporary communication cut-off during communication has been considered not to affect communication quality after rake synthesis, that is judged from the displacement of the level drop in a wireless section estimated from said common pilot channel to affect the communication quality after said raked synthesis when said UE is approaching.

5. A handover control method for use in a mobile communication system wherein, when any of UEs moves to an adjoining cell, handover control over the UE takes place, comprising in each of said UEs:

a step of measuring the reception quality of a dedicated physical channel allocated, together with a common pilot channel over which common transmission takes place within the cell, for communication use to each of said UEs;

a step of determining a handover destination cell on the basis of the result of that measurement;

a step of determining whether or not communication quality after rake synthesis satisfies a requirement for quality;

a step of searching, in said handover control, for a cell needed for obtaining required communication quality by switching during communication said handover destination cell; and a step of excluding, in said handover control, from said handover destination cells, any handover destination cell that does not conform to a power control request transmitted from said UE during communication;

a step of measuring, in said handover control, the reception quality of said dedicated physical channel for each of said handover destination cells;

a step of temporarily cutting off communication with any cell whose dedicated physical channel has been measured to be poor in reception quality; and on said UE side, a step of excluding, in said handover control, from said handover destination cells any handover destination cell whose temporary communication cut-off during communication would not affect communication quality after rake synthesis.

6. The handover control method according to claim 5, further including on said UE side a step of keeping, in said handover control, among said handover destinations any cell, out of the handover destination cells whose temporary communication cut-off during communication has been considered not to affect communication quality after rake synthesis, that is judged from the displacement of the level drop in a wireless section estimated from said common pilot channel to affect the communication quality after said raked synthesis when said UE is approaching.

* * * * *